United States Patent [19]

Maruyama

[11] Patent Number: 5,519,538
[45] Date of Patent: May 21, 1996

[54] ZOOM LENS FOR PREVENTING IMAGE FROM BEING BLURRED

[75] Inventor: Koichi Maruyama, Tokyo, Japan

[73] Assignee: Asahi Kogaku Kogyo Kabushiki Kaisha, Tokyo, Japan

[21] Appl. No.: 141,124

[22] Filed: Oct. 21, 1993

[30] Foreign Application Priority Data

Oct. 22, 1992 [JP] Japan .................................. 4-284553

[51] Int. Cl.⁶ .......................... G02B 15/14; G02B 27/64
[52] U.S. Cl. .......................... 359/683; 359/557; 359/689
[58] Field of Search .................................. 359/683, 689, 359/554, 557, 686

[56] References Cited

U.S. PATENT DOCUMENTS

| | | | |
|---|---|---|---|
| 5,182,671 | 1/1993 | Kitagishi | 359/557 |
| 5,270,857 | 12/1993 | Oizumi et al. | 359/557 |

FOREIGN PATENT DOCUMENTS 50-80846 7/1975 Japan .
2-309329 2/1990 Japan .

*Primary Examiner*—Scott J. Sugarman
*Attorney, Agent, or Firm*—Kane, Dalsimer, Sullivan, Kurucz, Levy, Eisele and Richard

[57] ABSTRACT

A zoom lens including at least two lens groups which move relative to one another in an optical axis direction to change the focal length of the zoom lens, wherein during the zooming operation in which the relative movement of the lens groups occurs to move the lens system in the telephoto direction, the lens group that is located closest to the image side of the zoom lens is advanced towards an object side, and a deflector which is provided closer to the image side than the lens group closest to the image side is externally driven to deflect a light flux of the zoom lens.

14 Claims, 9 Drawing Sheets

21.6　　　　　　0　　　　　-21.6　　0.1mm

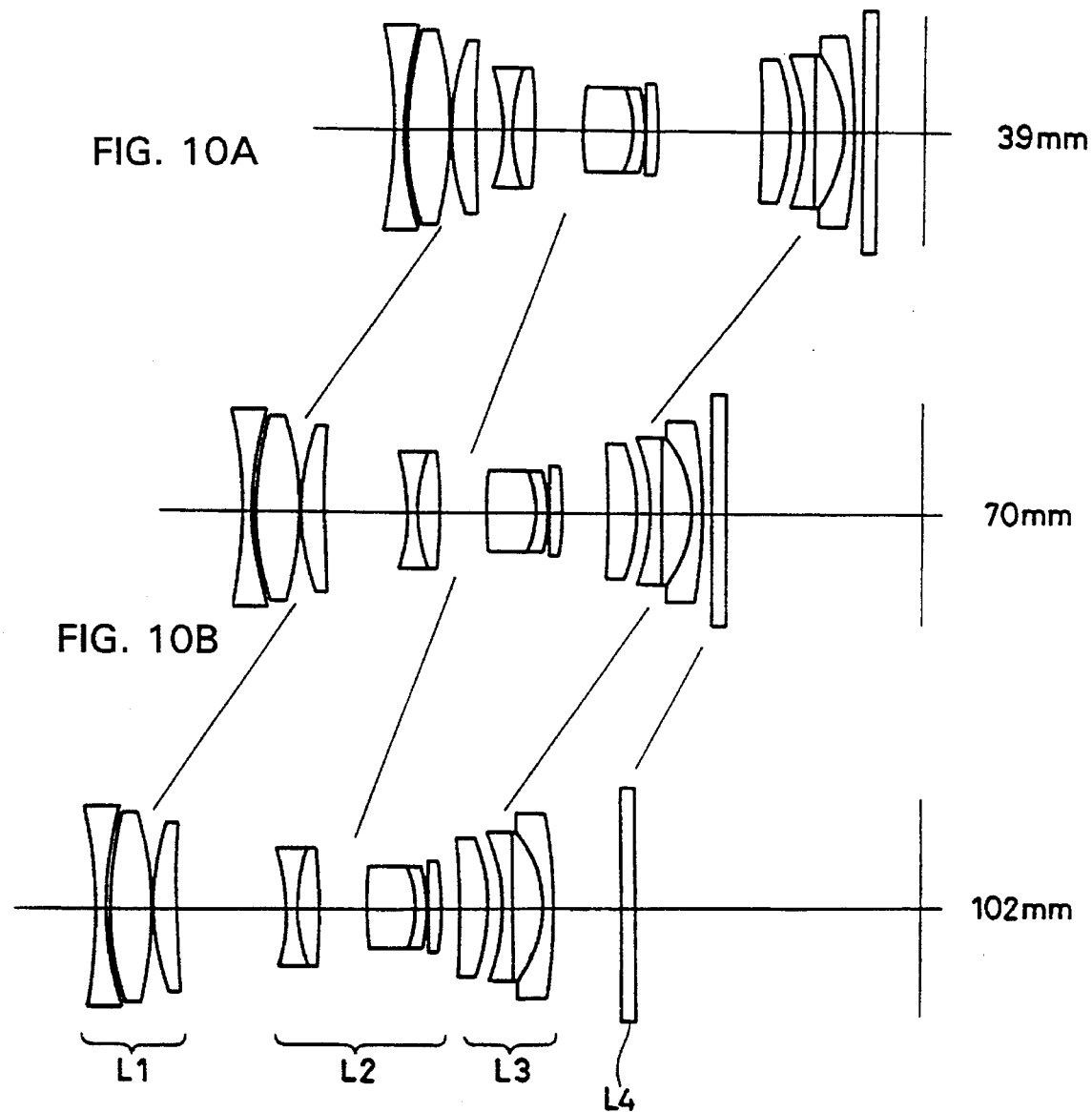
FIG. 10A  39mm
FIG. 10B  70mm
FIG. 10C  102mm
L1  L2  L3  L4

ZOOM LENS FOR PREVENTING IMAGE FROM BEING BLURRED

BACKGROUND OF THE INVENTION

1. Field of the Invention

The present invention relates to a zoom lens which prevents an image from being blurred due to an accidental motion of a camera or camera-shake, etc., and which is particularly advantageous for use in a compact camera.

2. Description of Related Art

In a conventional lens shutter type camera having a zoom lens in which the focal length in the telephoto range of the zoom lens must be increased to enhance the zoom magnification and to make the camera more compact, a photograph tends to be blurred with even the slightest camera-shake. To prevent the image from being blurred, a zoom lens system which deflects the optical flux of the image to obtain a stabilized image has been proposed.

One of the proposals is to provide a prism in a lens on the side of an object to be photographed. To this end, it is necessary that the diameter of the prism be large. However, a large prism requires a large and heavy driving mechanism, which results in a large and heavy lens system as a whole. Accordingly, it is difficult to realize a compact camera with such a lens system.

SUMMARY OF THE INVENTION

An object of the present invention is to provide a simple zoom lens which prevents an image from being blurred due to an accidental motion of a camera or camera-shake, and which can be advantageously used for a compact camera.

SUMMARY OF THE INVENTION

To achieve the object mentioned above, according to the present invention, a zoom lens is provided which includes at least two lens groups which move relative to one another in an optical axis direction to change the focal length of the zoom lens, wherein a lens group that is located closest to an image side is advanced towards the object when a zooming operation is made in a telephoto direction, and wherein a deflector is provided closer to the image side than the lens group closest to the image side, the deflector being externally driven to deflect an light flux of the zoom lens. In other words, the deflector is located between the lens group closest to the image side and the image plane.

The deflector can be moved in the optical axis direction in accordance with the movement of the lens group closest to the image side during the zooming operation. And, for example, when the lens group has an accidental motion, so that the optical axis thereof is inclined, the deflector deflects the light flux in a direction to cancel the inclination.

Generally speaking, the light flux that has traversed the lens system has little residual aberration in the vicinity of the image plane. Accordingly, there might be only a small aberration which is produced by deflection of the optical path. Consequently, from the viewpoint of aberration correction, it is preferable that the deflector is located close to the image side.

If the deflector which is comprised of, for example, a variable apex angle prism is located closer to the image side than the lens group that is located closest to the image side, the prism can be accommodated in the camera body. This makes it possible to prevent a photograph from being blurred by the oscillation (i.e., camera-shake) given to the camera without increasing the size of the camera body as a whole.

In general, a zoom lens of a compact camera has a short back focal distance on a wide angle side, and the lens closest to the image side is extremely close to the image surface. Accordingly, if the deflector is located next to the image surface, the deflector would come closer to the image surface on the wide angle side. The displacement of the image by the deflection of the light path is proportional to the distance between the deflecting surface of the deflector and the image surface. Consequently, if the deflector is located close to the image surface, the apex angle of the prism necessary to move the object image becomes relatively large. This results in an aberration or a focus deviation at the peripheral portion of the image plane.

Furthermore, since the displacement of the image caused by the inclination of the lens system is in proportion to the focal length of the lens, there is less need prevent image blur in the shorter focal length range of the zoom lens than in the telephoto range in which the focal length is longer.

Consequently, in a zoom lens in which the back focal distance increases as the focal length increases, if the deflector is located close to the lens group that is placed closest to the image side and is advanced in accordance with the zooming, the deflector is preferably driven in such a way that the deflector is not effected in the wider angle range (i.e., shorter focal length range). Displacement of the image due to the inclination of the lens system should be corrected by the deflector only when the focal length is above a predetermined value.

The deflection angle of the deflector that is necessary to eliminate blur is determined by a calculating mechanism in accordance with a factor of proportionality which depends on focal length data and inclination angle data of the lens system which is obtained by a posture or movement detecting mechanism of the camera. The deflection angle of the deflector is output as a drive signal to a deflector driving mechanism.

If it is not necessary for the deflector to be effected on the wide angle side, the factor of proportionality at the focal length at which no drive is necessary is set at zero (0) so that deflector cannot be driven on the wide angle side, even if the calculating mechanism and/or the deflector driving mechanism continuously operate(s).

If the deflector, which is advanced in the optical axis direction in accordance with the zooming operation, is moved together with the lens group closest to the image side, the driving mechanism for moving the deflector could be simplified.

The relationship between the deflection angle of the light flux generated by the deflector and the displacement of the image caused by the deflection in a direction perpendicular to the optical axis is in proportion to the distance between the deflecting surface of the deflector and the image surface, as mentioned above. Consequently, if the deflector is moved in the optical axis direction in accordance with the zooming operation while maintaining the proportional relationship between the focal length and the distance between the deflecting surface of the deflector and the image surface, the factor of proportionality is constant. Accordingly, blur will be corrected at an apex angle of the deflector corresponding to the inclination angle of the picture taking optical system, regardless of the change in focal length.

The variable apex angle prism can be made, for example, of a prism which contains therein a liquid material. Alternatively, the deflector can be realized by a pair prisms which face each other and are rotatable about the optical axis, or a combination of a plano-convex lens and a plano-concave lens which face each other, one of which can be inclined. In view of the simplification of the control and realization of a compact camera, a prism containing a liquid material is most preferable.

According to another aspect of the present invention, a zoom lens is provided that includes a zoom lens system having at least two front and rear movable lens groups, a deflector within the zoom lens system for offsetting an inclination of an optical axis of the zoom lens system to thereby prevent an image from being blurred upon photographing, a deflector having a variable deflection angle and, a driving mechanism for moving the deflector in an optical axis direction so that a distance from the deflecting surface to the image surface is substantially in proportion to the focal length. However, it should be noted that, in case that displacement of the image be corrected by the deflector is necessary only when the focal length is above a predetermined value, it is unnecessary to move the deflector when the focal length is below the predetermined value.

Preferably, the deflector is located closer to the image side than the movable lens that is located closest to the image.

Preferably, the deflector is only effected in a a focal length range above a predetermined value of the zoom lens (i.e., telephoto range).

According to still another aspect of the present invention, a zoom lens system is provided that includes at least two front and rear movable lens groups, a deflector for offsetting an inclination of an optical axis of the zoom lens system to thereby prevent an object image from being blurred upon photographing, the deflector having a variable deflection angle and, a mechanism for effecting deflection only in a focal length zoom range above a predetermined focal length of the zoom lens, so that deflection does not occur in a short focal length range below the predetermined focal length of the zoom lens.

The present disclosure relates to subject matter contained in Japanese patent application No. 4-284553 (filed on Oct. 22, 1992) which is expressly incorporated herein by reference in its entirety.

BRIEF DESCRIPTION OF THE DRAWINGS

The present invention will be described below in detail with reference to the accompanying drawings, in which;

FIGS. 10A, 10B and 10C are conceptual views of a camera-shake compensating zoom lens at focal lengths of 39 mm, 70 mm, and 102 mm, respectively, according to a second embodiment of the present invention;

DESCRIPTION OF THE PREFERRED EMBODIMENTS

Figure 1:
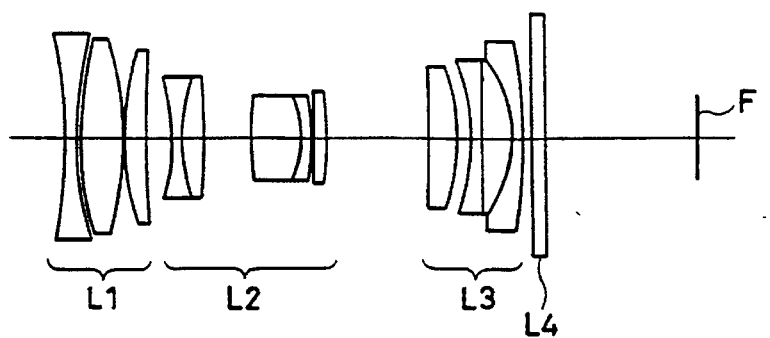
FIG. 1 is a conceptual view of a camera-shake compensating zoom lens at a focal length of 39 mm at which there is no inclination, according to a first embodiment of the present invention.

First Embodiment:

FIG. 1 shows an optical arrangement of an oscillation compensating zoom lens system at a focal length of 39 mm. The lens system shown in FIG. 1 is comprised of three movable lens groups including a first (i.e., front) lens group L1, a second (i.e., intermediate) lens group L2, and a third (i.e., rear) lens group L3, in this order from the object side. Upon varying the magnification (i.e., power) of the zoom lens in the telephoto direction, all three of the lens groups are moved far away from an image surface F. The second lens group L2, however, is moved towards the image side relative to the first and third lens groups, so that the distance between the first lens group L1 and the second lens group L2 becomes larger and the distance between the second lens group L2 and the third lens group L3 becomes smaller. A prism L4, which constitutes a deflector, is located closer to the image side than the third lens group L3. The prism L4, having a variable apex angle, is moved together with the third lens group L3 in the optical axis direction.

Tables 1 and 2 below show numerical examples of characteristics of the optical elements of the zoom lens system, according to the first embodiment. In Tables 1 and 2, "surface numbers" represent lens surfaces numbered from the object side (i.e., beginning on the left side in FIG. 1), "r" designates the radius of curvature of the lens surfaces, "d" the lens thickness or spatial distance, "n" the refractive index at the d-line (588 nm), "ν" the Abbe number, "FNO" the f-number, "f" the focal length, and "ω" the half field angle.

TABLE 1

| surface number | r | d | ν | ν |
|---|---|---|---|---|
| 1 | −70.000 | 1.50 | 1.83400 | 37.2 |
| 2 | 47.000 | 0.51 | | |
| 3 | 43.200 | 5.47 | 1.58913 | 61.2 |
| 4 | −43.200 | 0.10 | | |
| 5 | 30.750 | 3.18 | 1.58913 | 61.2 |
| 6 | 152.239 | variable | | |
| 7 | −25.970 | 1.20 | 1.83481 | 42.7 |
| 8 | 21.730 | 3.09 | 1.80518 | 25.4 |
| 9 | −86.431 | 6.07 | | |
| 10 | 47.859 | 6.68 | 1.51633 | 64.1 |
| 11 | −11.970 | 1.35 | 1.80518 | 25.4 |
| 12 | −22.263 | 0.10 | | |
| 13 | 213.954 | 1.90 | 1.58913 | 61.2 |
| 14 | −36.900 | variable | | |
| 15 | −102.000 | 3.80 | 1.80518 | 25.4 |
| 16 | −23.205 | 1.76 | | |
| 17 | −24.230 | 1.30 | 1.83400 | 37.2 |
| 18 | 575.504 | 3.93 | | |
| 19 | −15.800 | 1.40 | 1.77250 | 49.6 |
| 20 | −67.049 | 1.00 | | |
| 21 | ∞ | 2.00 | 1.49000 | 56.0 |
| 22 | ∞ | | | |

TABLE 2

| | | | |
|---|---|---|---|
| f | 39.12 | | |
| fB | 6.45 | 70.00 | 102.00 |
| | | 26.50 | 46.70 |
| FNO. | 1:4.0 | 1:6.1 | |
| ω | 29.0° | 16.8° | 1:8.2 |
| d6 | 3.50 | 11.00 | 11.8° |
| d14 | | | |
| | 13.36 | 5.87 | 14.51 |
| | | | 2.36 |

Figures 2A, 2B, 2C, 2D, 2E:
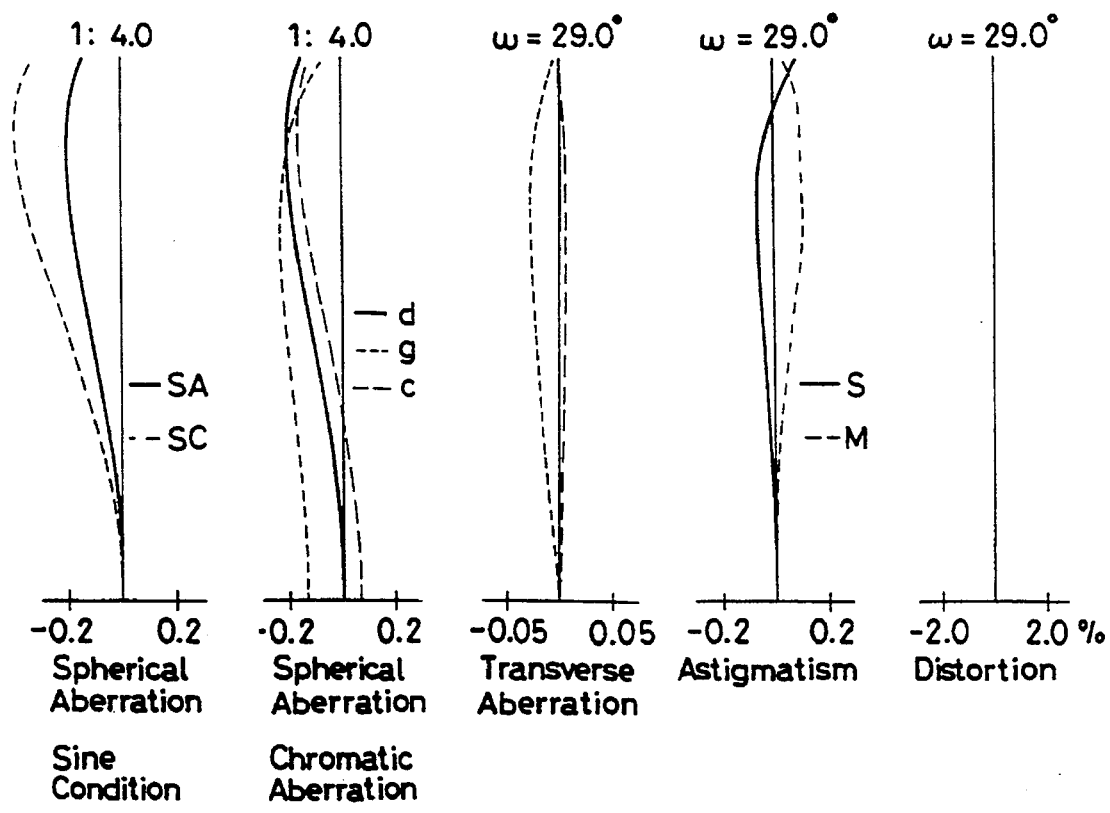
FIG. 2A–2E are diagrams of aberrations in a compensating zoom lens shown in FIG. 1.

FIG. 2 shows spherical aberration SA, sine condition SC, chromatic aberration represented by spherical aberration at line d, line g, and line C, transverse chromatic aberration, astigmatism (S: sagittal, M: meridional), and distortion. FIG. 2 corresponds to a focal length of 39 mm, at which the optical axis is not inclined because the apex angle of prism L4 is set at zero, in the first embodiment.

Figure 3:
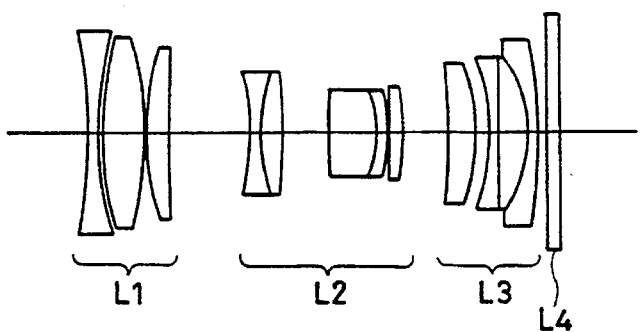
FIG. 3 is a conceptual view of a camera-shake compensating zoom lens at a focal length of 70 mm at which there is no inclination, according to a first embodiment of the present invention.
Figures 4A, 4B, 4C, 4D, 4E:
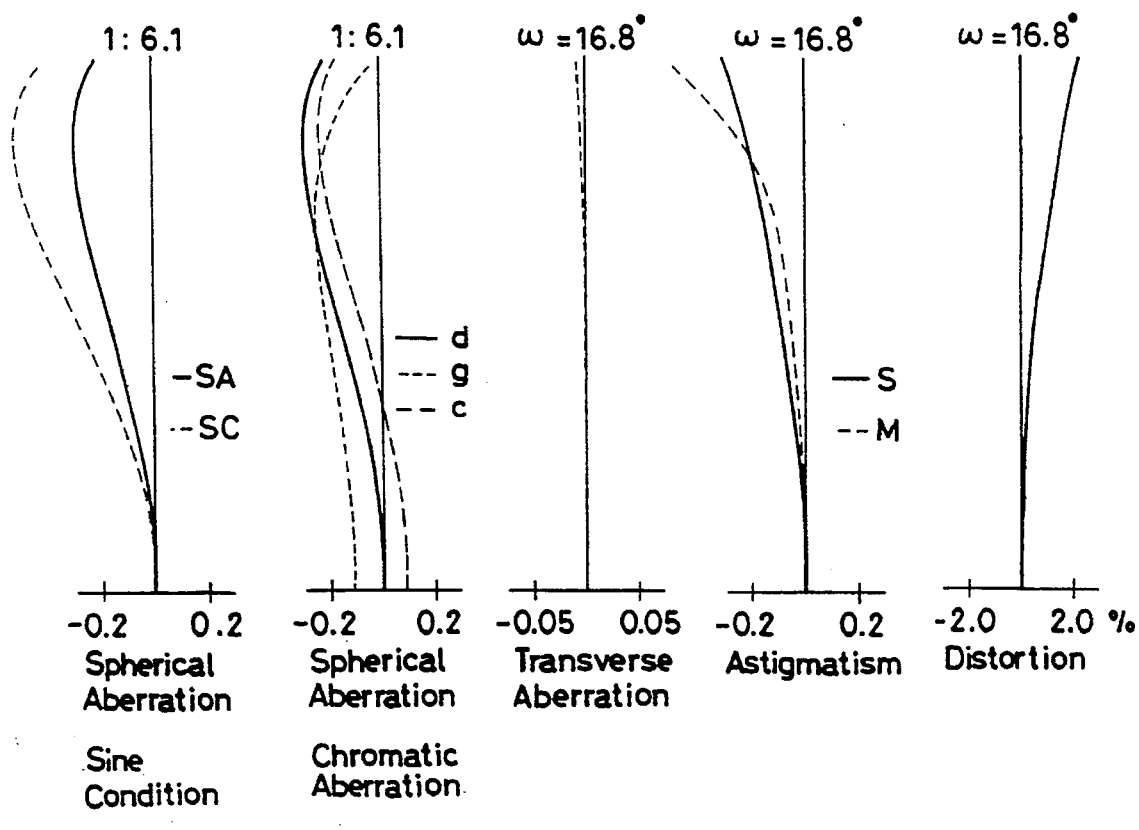
FIG. 4A–4E are diagrams of aberrations in a camera-shake compensating zoom lens shown in FIG. 3.

FIG. 3 shows an optical arrangement of a camera-shake compensating zoom lens system at a focal length of 70 mm. FIG. 4 shows various aberrations of the oscillation compensating zoom lens system shown in FIG. 3, respectively.

Figure 5:
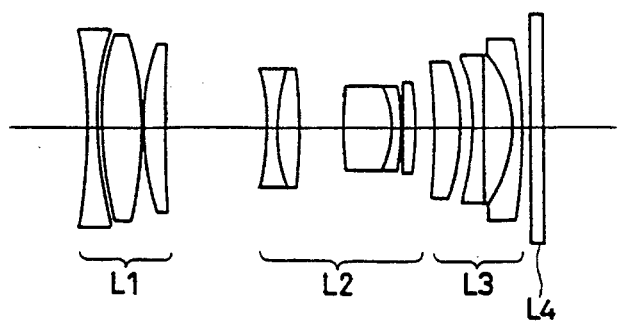
FIG. 5 is a conceptual view of a camera-shake compensating zoom lens at a focal length of 102 mm at which there is no inclination, according to a first embodiment of the present invention.
Figures 6A, 6B, 6C, 6D, 6E:
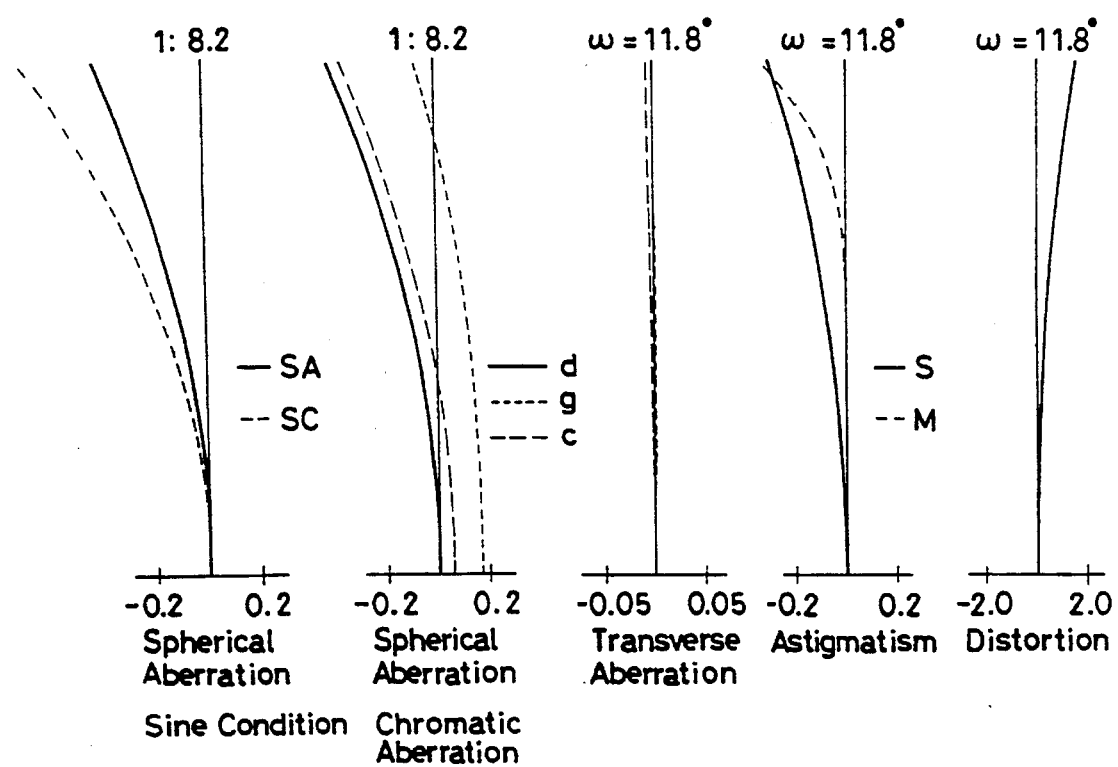
FIG. 6A–6E are diagrams of aberrations in a camera-shake compensating zoom lens shown in FIG. 5.

FIG. 5 shows an optical arrangement of a camera-shake compensating zoom lens system at a focal length of 102 mm. FIG. 6 shows various aberrations of the camera-shake compensating zoom lens system shown in FIG. 5.

In the first embodiment, the variable apex angle prism L4 is not driven when the focal length is within a predetermined range on the wide angle side, even if the lens system is inclined. However, when the focal length is greater than a predetermined value, the apex angle of the prism L4 is varied in accordance with the focal length and the inclination angle of the lens system.

Figure 7:
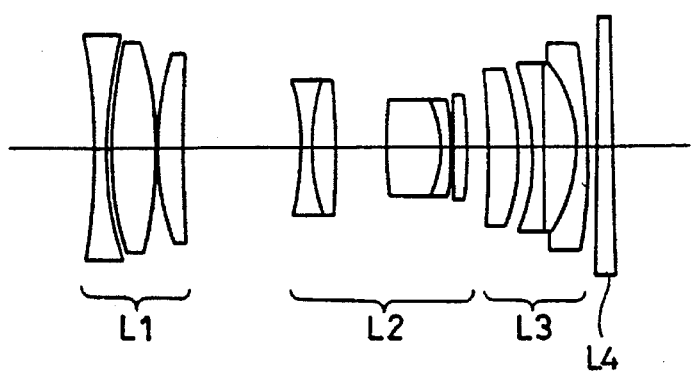
FIG. 7 is a conceptual view of a camera-shake compensating zoom lens at a focal length of 102 mm at which an inclination of the zoom lens is corrected by changing an apex angle of a prism, according to a first embodiment of the present invention.

For example, if the lens system has an inclination angle of 0.5° at a telephoto extremity of the system, the prism L4 is driven to an apex angle of 2.16° to thereby correct the displacement of the image. FIG. 7 shows an arrangement of the optical elements in a camera-shake compensating zoom lens system after the correction of the image displacement is completed.

Figures 8A, 8B, 8C:
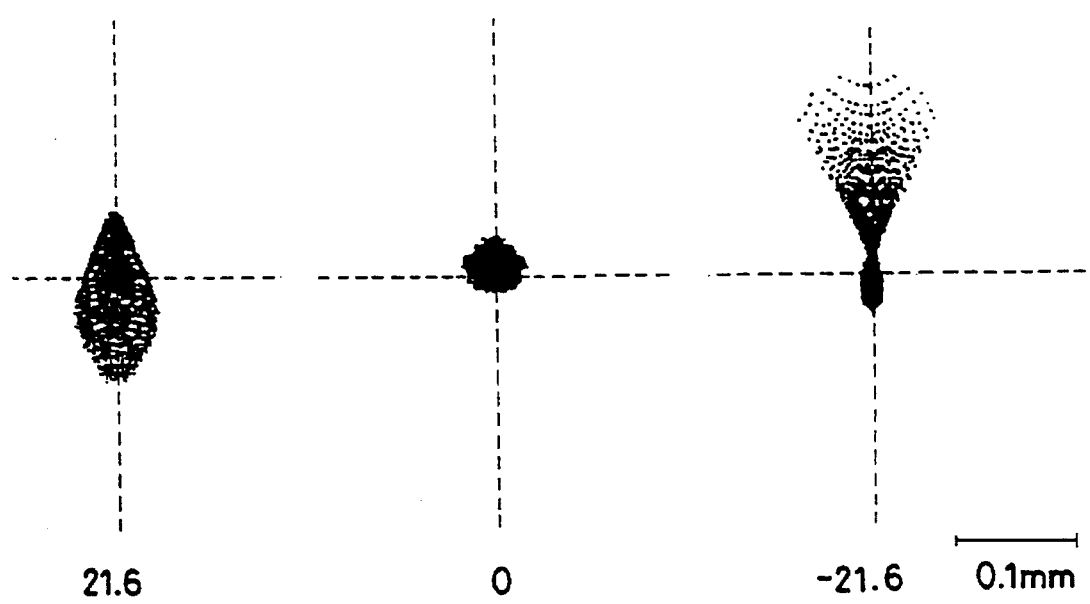
FIG. 8A–8C are spot diagrams at a focal length of 102 mm at which an inclination of the zoom lens is corrected by a deflector, according to a first embodiment of the present invention.

FIG. 8 shows diagrams of beam spots on the image surface after the inclination of the lens system has been corrected by changing the apex angle of the prism L4 at the telephoto extremity of the zoom lens, so that the displacement of the image on the optical axis becomes zero, as shown in FIG. 7. In FIG. 8, (a), (b) and (c) correspond to the beam fluxes which would be converged at image heights of 21.6 mm, 0 mm (incident angle is 0°), and −21.6 mm, respectively.

Figures 9A, 9B, 9C:
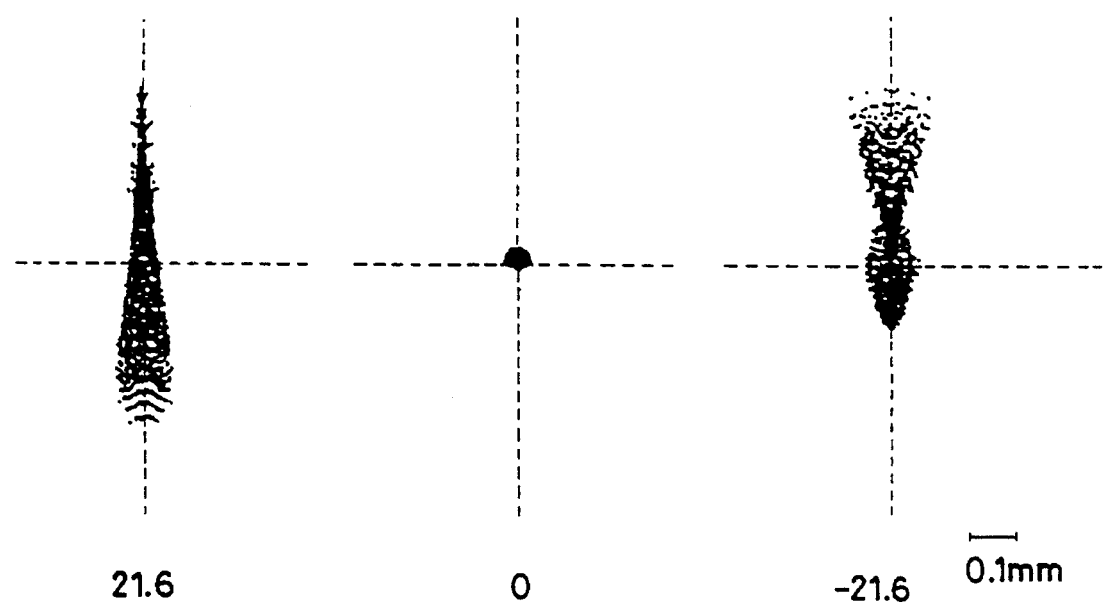
FIG. 9A–9C are spot diagrams at a focal length of 39 mm at which an inclination of the zoom lens is corrected by a deflector, according to a first embodiment of the present invention.

FIG. 9 shows diagrams of beam spots similar to FIG. 8 for the sake of comparison. In FIG. 9, the displacement of the image which would result when the lens system is inclined by an inclination angle of 0.5° at the wide angle extremity is corrected by changing the apex angle of the prism L4 to 5.11°, so that the displacement of the image on the optical axis becomes zero similar to the case shown in FIG. 8.

As can be seen in FIGS. 8 and 9, the beam spots at the peripheral portion of the lens are dispersed, as compared with the center portion of the lens, on both the telephoto and wide angle sides. However, the degree to which the beam spots are dispersed (i.e., length of dispersion) on the wide angle side (FIGS. 9 (a),(c)) is larger than (almost twice) that of the telephoto angle side (FIGS. 9 (a),(c)). It is apparent from this result that compensation for camera shake is necessitated in the telephoto range before the wide angle range. It should be noted that the blurred beam spots in the vertical direction in FIGS. 8 and 9 result from a curvature of field which is caused mainly by prism L4.

As can be seen from FIG. 9, on the wide angle side, not only does the change in apex angle of the prism result in only a slight displacement of the image, but curvature of the field occurs due to the deflection. Consequently, inclination of the image surface by the prism adjustment will likely result in an image that is out of focus, particularly at the peripheral portion of the image plane, while only marginally correcting for the displacement of the image by the deflection. Hence, correction of the lens system inclination is not as necessary on the wide angle side as it is on the telephoto side. Nevertheless, if correction of the image at the peripheral portion of the image plane should be prioritised, it is of course possible to carry out deflection of the light flux to thereby correct displacement of the image on the wide angle side as well.

Second Embodiment

FIGS. 10A, 10B and 10C show an optical arrangement of the optical elements according to a second embodiment of the present invention in which the same lens system as the first embodiment is used. The variable apex angle prism L4 is moved so as to maintain a predetermined proportional relationship between the distance of the prism from the image surface and the focal length, within a predetermined focal length range on the telephoto side. FIGS. 10A, 10B and 10C correspond to the focal lengths of 39 mm, 70 mm, and 102 mm, respectively.

In the second embodiment, the distance between the third lens group L3 and the prism L4 is fixed at 1.00 mm on the wide angle side, between the focal lengths of 39 mm and 70 mm, and is gradually and linearly varied on the telephoto side, between the focal lengths of 70 mm and 102 mm. At the focal length of 102 mm, the distance between the third lens group L3 and the prism L4 is 8.50 mm. The back focal distance at the telephoto extremity is 39.20 mm.

Consequently, if the inclination angle of the whole lens system is 1°, the blur can be corrected for the focal lengths of 70 mm through 102 mm, while the apex angle of the variable apex angle prism L4 is maintained at 5.14°.

Figure 11:
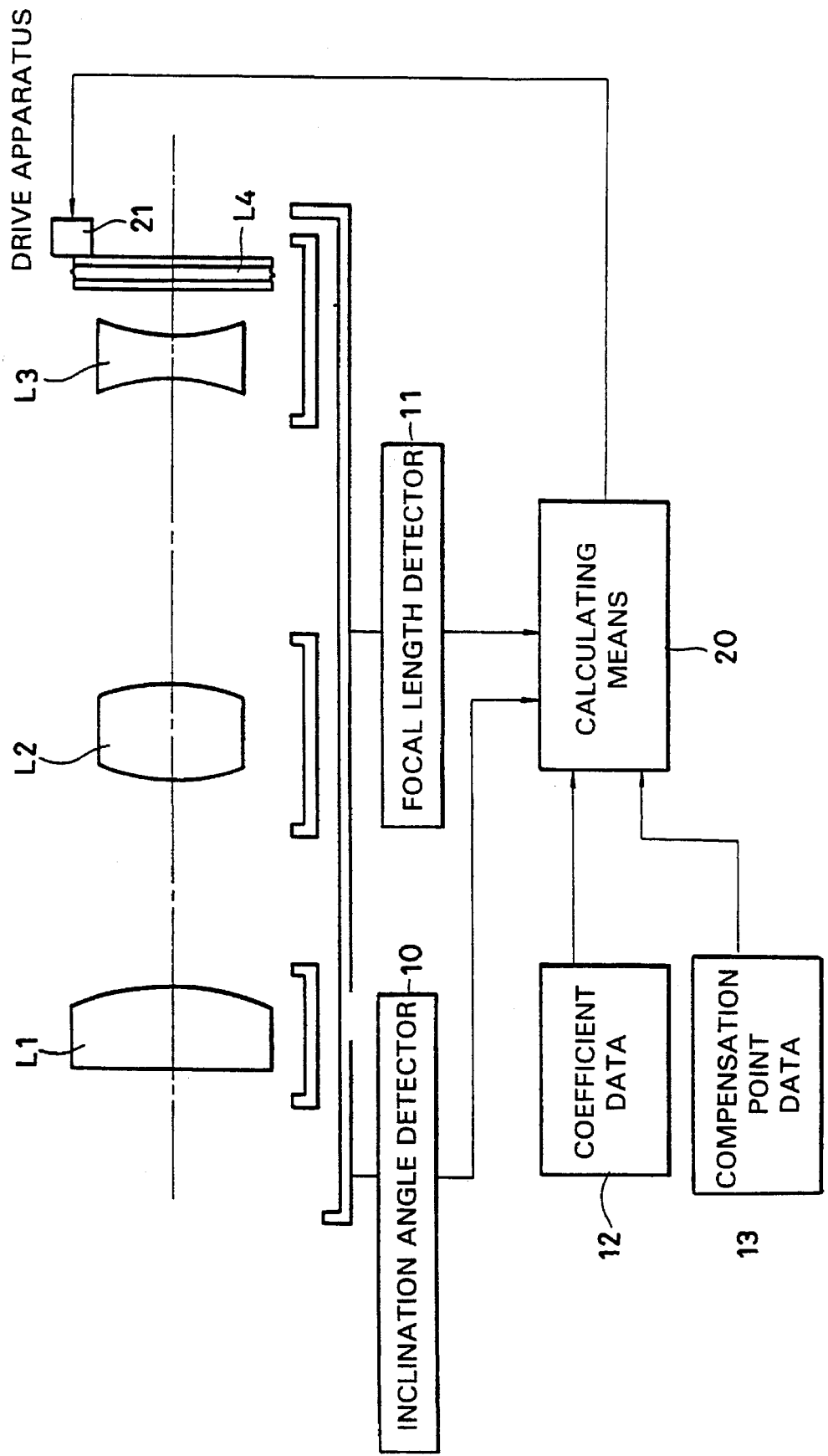
FIG. 11 is a block diagram of a control system for a camera-shake compensating zoom lens, according to the first or second embodiment of the present invention.

FIG. 11 shows a block diagram of a control system of a zoom lens according to the first or second embodiments mentioned above. In FIG. 11, data output from an inclination angle detector 10, which detects the inclination angle of the lens system, and a focal length detector 11, which detects the focal length of the zoom lens, is inputted to a calculating circuit (i.e., arithmetic operating circuit) 20 to obtain the deflection angle of the deflector (i.e., the apex angle of the prism L4). In this calculation, proportionality data and compensation point data at which the adjustment of the deflector is effected are read from a factor data storing means 12 and a compensation point data storing means 13, respectively.

The factor data represents a relationship between the inclination of the lens system and the apex angle of the prism for the correction of image displacement. The factor of proportionality varies in accordance with the focal length in the first embodiment and is a constant value in the second embodiment.

The compensation point data represents a reference focal length on the wide angle side at which the prism is not driven, since a significant blur correcting effect cannot be expected, as mentioned above. In both the first and second embodiments, the reference focal length (i.e., compensation point) is set at 70 mm.

In the first embodiment, if the factor is set at 0 within the focal lengths of 39 mm through 70 mm, the compensation point storing means 13 can be omitted.

When the apex angle of the prism L4 is calculated by the calculating means 20, the the prism L4 is driven so that the apex angle of the prism is identical to the calculated value. Consequently, the blur (i.e., displacement) of the image caused by the inclination of the lens system can be appropriately compensated for at any focal length within the controllable range of the prism L4.

Figure 12A:
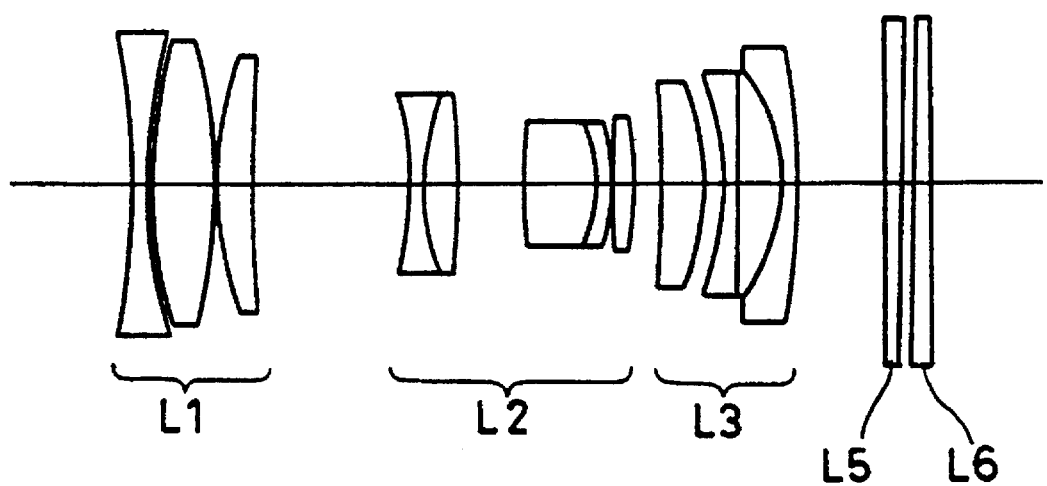
FIGS. 12A and 12B are conceptual views of a camera-shake compensating zoom lens including a modified deflector which is comprised of two rotatable prism elements; and, FIGS. 13A and 13B are conceptual views of a camera-shake compensating zoom lens including a modified deflector which is comprised of the combination of a plano-convex lens and a plano-concave lens.
Figure 12B:
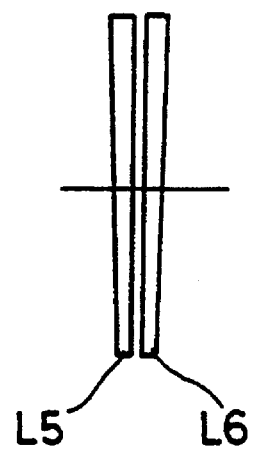

FIGS. 12A and 12B, and FIGS. 13A and 13B show two modified deflectors. In FIGS. 12A and 12B, the deflector is comprised of two wedge-shaped prism elements 5 and 6 having the same deflection function. The prism elements 5 and 6 are rotatable about the optical axis. The prism elements 5 and 6 are arranged such that the deflecting functions thereof are cancelled when there is no inclination of the lens system, as shown in FIG. 12A. If an inclination of the lens system exists, at least one of the prism elements 5 and 6 is rotated through a predetermined angle about the optical axis to deflect the optical path of the lens system to thereby correct for image displacement resulting from the inclination of the lens system, as shown in FIG. 12B.

Figure 13A:
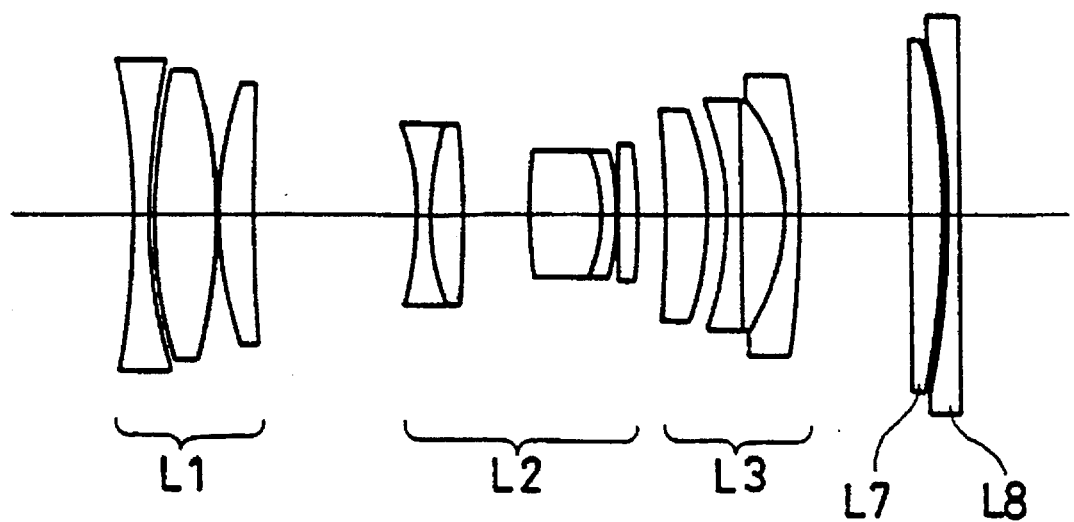
Figure 13B:
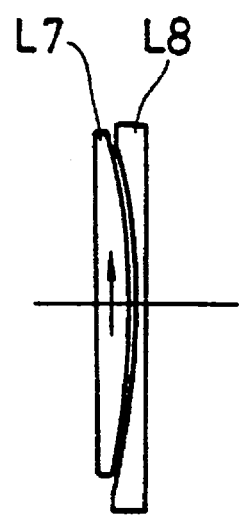

In FIGS. 13A and 13B, the deflector is comprised of a plano-convex lens 7 and a plano-concave lens 8 in combination. The plano-convex lens 7 and the plano-concave lens 8 are juxtaposed, so that the convex surface and the concave surface are facing each other. The radii of curvatures of the curved lens surfaces (i.e., convex surface and concave surface) of the lenses 7 and 8 are identical but are opposite in sign (i.e., positive and negative powers). If there is no inclination of the lens system, the optical axes of the plano-convex lens 7 and the plano-concave lens 8 are aligned with the optical axis of the lens system, so that the lens system as a whole exhibits no power, as shown in FIG. 13A.

Conversely, if the lens system is inclined, the plano-concave lens 8 is inclined along the spherical surface of the concave surface so as to provide a prism effect, as shown in FIG. 13B.

If the deflector is comprised of lenses having positive and negative powers and arranged so as to selectively cancel the power, as shown in FIGS. 13A and 13B, it is preferable that the plano-convex lens 7 is located at the object side and the plano-concave lens 8 is located at the image side. This is because, in such an arrangement, the distance between the plano-convex lens 7 and the plano-concave lens 8 is reduced, resulting in little or no occurrence of the aberration.

I claim:

1. A zoom lens for preventing an image from being blurred, including at least two lens groups which move relative to one another in an optical axis direction to change a focal length of said zoom lens, wherein a lens group that is located closest to the image side of the zoom lens is advanced towards said object when a zooming operation is effected from a shorter focal length to a longer focal length side, and wherein a deflector is provided closer to the image side than the lens group closest to the image side, said deflector being externally driven in a long focal length zoom range above a predetermined focal length of said zoom lens to deflect a light flux of said zoom lens to correct an image blur caused by an inclination of said zoom lens optical axis and wherein said deflector is not driven in a short focal length zoom range below said predetermined focal length.

2. The zoom lens of claim 1, wherein said deflector is moved in said optical axis direction together with said lens group located closest to said image side during said zooming operation.

3. The zoom lens of claim 1, wherein said deflector is moved in said optical axis direction to increase a distance between said image and said deflector, at least in said long focal length range above a predetermined focal length of said zoom lens.

4. The zoom lens of claim 3, wherein said deflector is provided with a deflecting surface and is moved in said optical axis direction so that a distance between said deflecting surface and said image is substantially in proportion to said focal length.

5. The zoom lens of claim 1, wherein said deflector is comprised of a prism having a variable apex angle and containing therein a liquid material.

6. The zoom lens of claim 1 wherein said deflector comprises two wedge shaped prism elements.

7. The zoom lens of claim 1 wherein said deflector comprises a juxtaposed plano-convex lens and a plano-concave lens with a convex surface of said plano-convex lens facing a concave surface of said plano-concave lens.

8. The zoom lens of claim 7 wherein the radii of curvature of said convex surface and concave surface are identical but of opposite powers.

9. The zoom lens of claim 8 wherein the plano-convex lens is located at the object side and the plano-concave lens is located at the image side.

10. A zoom lens system for preventing an image from being blurred, comprising:

a zoom lens system including at least two front and rear movable lens groups;

a deflector within said zoom lens system for offsetting an inclination of an optical axis of said zoom lens system, thereby preventing an image from being blurred upon photographing, said deflector having a variable deflection angle; and, a drive means for moving said deflector in an optical axis direction so that a distance between said deflecting surface and said image surface is substantially in proportion to a focal length of said zoom lens, said deflector only offsetting an inclination of said optical axis of said zoom lens system in a long focal length zoom range above a predetermined focal length of said zoom lens.

11. The zoom lens system of claim 10, wherein said deflector is located closer to said image side than a movable lens that is located closest to the image side.

12. A zoom lens system for preventing an image from being blurred, comprising:

a zoom lens system including at least two front and rear movable lens groups;

a deflector within said zoom lens system for offsetting an inclination of an optical axis of said zoom lens system, thereby preventing an image from being blurred upon photographing, said deflector having a variable deflection angle; and, a means for effecting deflection by said deflector only in a long focal length zoom range above a predetermined focal length of said zoom lens, so that deflection does not occur in a short focal length zoom range below said predetermined focal length of said zoom lens.

13. The zoom lens system of claim 12, further comprising:

a means for driving said deflector in an optical axis direction so that a distance between said deflecting surface and said image is substantially in proportion to said focal length of said zoom lens system.

14. The zoom lens system of claim 13, wherein said deflector is located closer to said image side than a movable lens that is located closest to said image side.

* * * * *